United States Patent
Prasad et al.

(10) Patent No.: US 10,276,049 B2
(45) Date of Patent: Apr. 30, 2019

(54) CAMERA BASED TRAILER IDENTIFICATION AND BLIND ZONE ADJUSTMENT

(71) Applicant: Aptiv Technologies Limited, St. Michael (BB)

(72) Inventors: Premchand Krishna Prasad, Carmel, IN (US); Robert J. Cashler, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 57 days.

(21) Appl. No.: 15/250,072

(22) Filed: Aug. 29, 2016

(65) Prior Publication Data
US 2018/0061239 A1   Mar. 1, 2018

(51) Int. Cl.
| | |
|---|---|
| G06K 9/00 | (2006.01) |
| G08G 1/16 | (2006.01) |
| H04N 7/18 | (2006.01) |
| G01S 13/88 | (2006.01) |
| G01S 13/86 | (2006.01) |
| G01S 13/93 | (2006.01) |

(52) U.S. Cl.
CPC ............ *G08G 1/167* (2013.01); *G01S 13/867* (2013.01); *G01S 13/88* (2013.01); *G06K 9/00791* (2013.01); *G06K 9/00798* (2013.01); *G06K 9/00805* (2013.01); *H04N 7/183* (2013.01); *B60W 2300/14* (2013.01); *G01S 13/931* (2013.01); *G01S 2013/9332* (2013.01); *G01S 2013/9378* (2013.01); *G01S 2013/9385* (2013.01)

(58) Field of Classification Search
CPC ...................................................... G08G 1/167
See application file for complete search history.

(56) References Cited

U.S. PATENT DOCUMENTS

| | | | |
|---|---|---|---|
| 9,373,044 B2* | 6/2016 | Wallat | B62D 15/025 |
| 2014/0267688 A1* | 9/2014 | Aich | H04N 7/181 |
| | | | 348/113 |
| 2015/0120141 A1* | 4/2015 | Lavoie | B62D 15/027 |
| | | | 701/41 |
| 2016/0041258 A1 | 2/2016 | Cashler et al. | |
| 2016/0101811 A1* | 4/2016 | Kyrtsos | B62D 13/06 |
| | | | 701/25 |

FOREIGN PATENT DOCUMENTS

GB   2518857 A   4/2015

* cited by examiner

*Primary Examiner* — Tracy Y. Li
(74) *Attorney, Agent, or Firm* — Joseph V. Bonadies (57) ABSTRACT

A trailer-identification system is configured to identify a trailer towed by a host-vehicle. The system includes a camera and a controller. The camera is used to capture an image of a trailer towed by a host-vehicle. The controller is in communication with the camera and is configured to detect a character on the trailer, identify a trailer-model of the trailer based on the character, and adjust a blind-zone proximate to the host-vehicle based on the trailer-model.

6 Claims, 7 Drawing Sheets

CAMERA BASED TRAILER IDENTIFICATION AND BLIND ZONE ADJUSTMENT

TECHNICAL FIELD OF INVENTION

This disclosure generally relates to a trailer-identification system, and more particularly relates to a trailer-identification system that adjusts a blind-zone proximate to a host-vehicle.

BACKGROUND OF INVENTION

Typical methods of trailer-detection include proximity-sensors, radar-sensors, cameras and direct operator input. Undesirably, a type of trailer being towed by a host-vehicle and the technical specifications of the trailer that may affect the safe operation of the combined host-vehicle and trailer are not typically included in the trailer-detection system.

SUMMARY OF THE INVENTION

In accordance with one embodiment, a trailer-identification system is provided. The trailer-identification system is configured to identify a trailer towed by a host-vehicle. The trailer-identification system includes a camera and a controller. The camera is used to capture an image of a trailer towed by a host-vehicle. The controller is in communication with the camera. The controller is configured to detect a character on the trailer, identify a trailer-model of the trailer based on the character, and adjust a blind-zone proximate to the host-vehicle based on the trailer-model.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
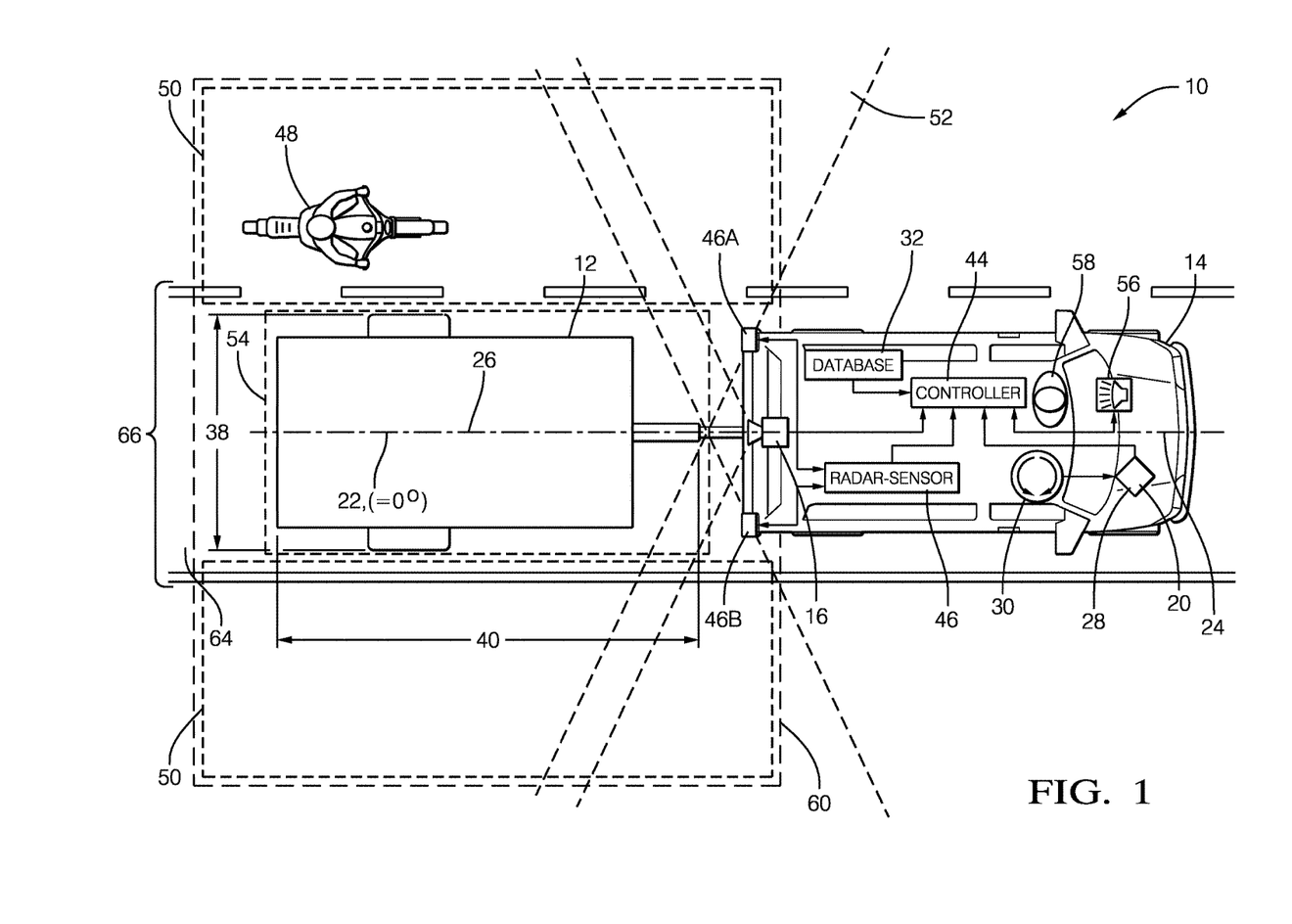
FIG. 1 is a top-view of a host-vehicle equipped with a trailer-identification system and towing a trailer in accordance with one embodiment.
Figure 2:
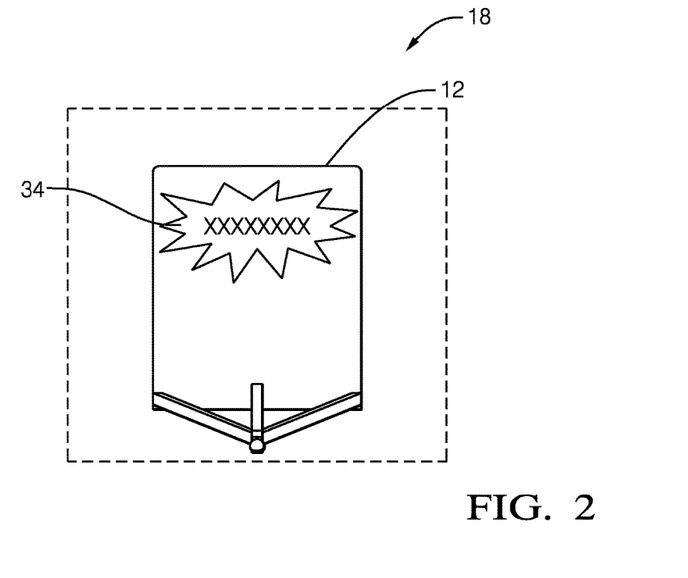
FIG. 2 is an image of a trailer captured by a camera of the trailer-identification system of FIG. 1 in accordance with one embodiment.

FIG. 1 illustrates a non-limiting example of a trailer-identification system 10, hereafter referred to as the system 10, configured to identify a trailer 12 towed by a host-vehicle 14. The system 10 includes a camera 16 used to capture an image 18 (FIG. 2) of the area behind the host-vehicle 14 that may include the trailer 12 towed by the host-vehicle 14. Examples of the camera 16 suitable for use on the host-vehicle 14 are commercially available as will be recognized by those in the art, one such being the ASX340AT from ON Semiconductor® of Phoenix, Ariz., USA. The camera 16 may be mounted on the rear of the host-vehicle 14 to have a view directed behind the host-vehicle 14. The camera 16 is typically a rear-facing video-type camera 16 or camera 16 that can capture the image 18 of the roadway and surrounding area at a sufficient frame-rate, of ten frames per second, for example.

Figure 4:
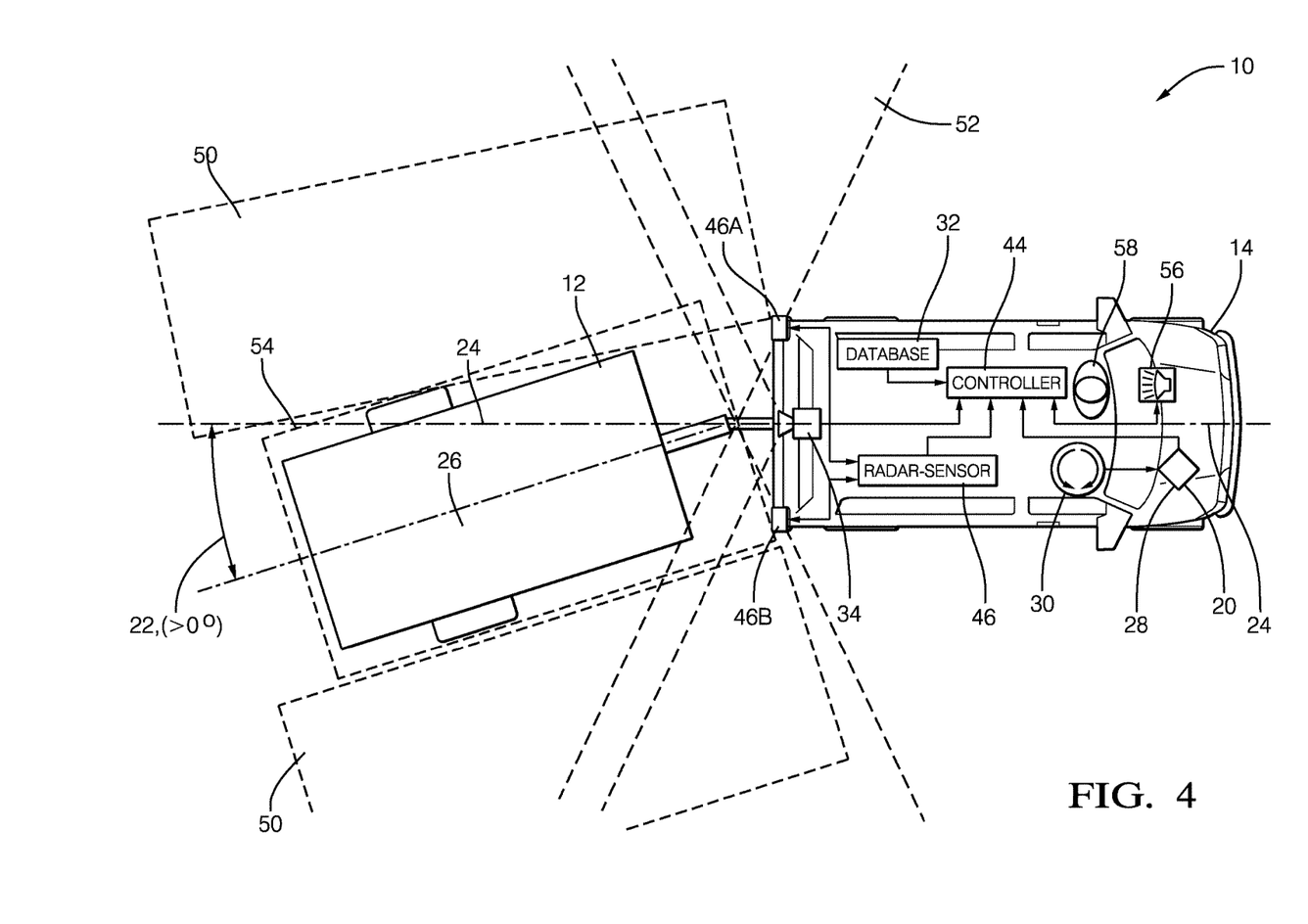
FIG. 4 is a top view of the same host-vehicle equipped with a trailer-identification system and towing a trailer of FIG. 1 in accordance with one embodiment.

The system 10 includes an angle-detector 20 used to determine a trailer-angle 22 of the trailer 12 relative to the host-vehicle 14. The trailer-angle 22 is defined as the angle between a host-vehicle-longitudinal-axis 24 and a trailer-longitudinal-axis 26, and is shown to be zero degrees (0°) in FIG. 1 (i.e. the trailer 12 is directly behind the host-vehicle 14). In contrast, FIG. 4 shows an example when the trailer-angle 22 is not zero. The angle-detector 20 may be a device (not shown) mounted on a trailer-hitch (not shown) of the host-vehicle 14 or on the trailer 12, that is configured to provide a measurement of the angle that exists between the host-vehicle-longitudinal-axis 24 and the trailer-longitudinal-axis 26. The angle-detector 20 may be a Lidar-sensor (not shown), or any other suitable method to detect the trailer-angle 22. Preferably, the function of the angle-detector 20 may be provided by a yaw-sensor 28 that may already exist on most vehicles, such as the 6DF-1N6-C2-HWL from Honeywell Sensing and Control, Golden Valley, Minn., USA, and is used to determine a yaw-rate 30 of the host-vehicle 14 from which the trailer-angle 22 may be determined. It is advantageous to use the yaw-sensor 28 of the host-vehicle 14 to determine the trailer-angle 22 to eliminate a separate component of the system 10, thereby reducing cost and complexity.

Figure 3:
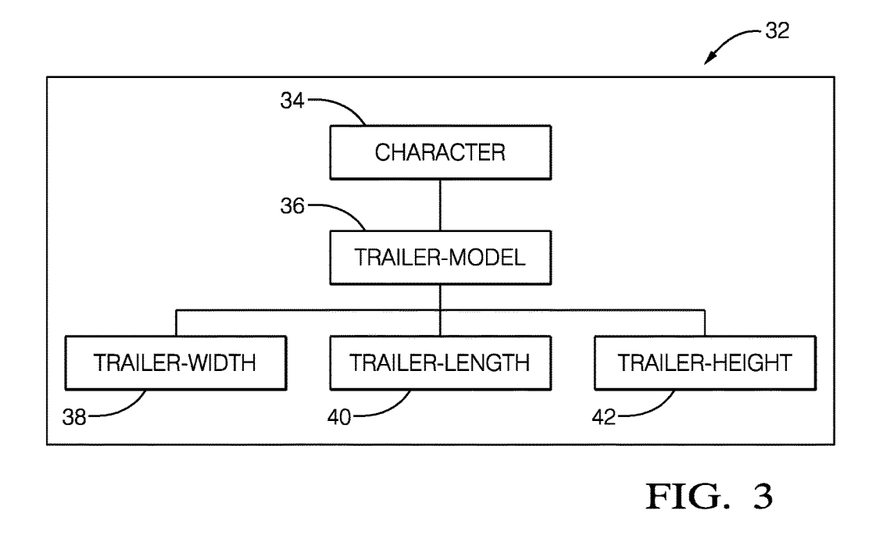
FIG. 3 is a diagram of a structure of a database of the trailer-identification system of FIG. 1 in accordance with one embodiment.
Figure 6:
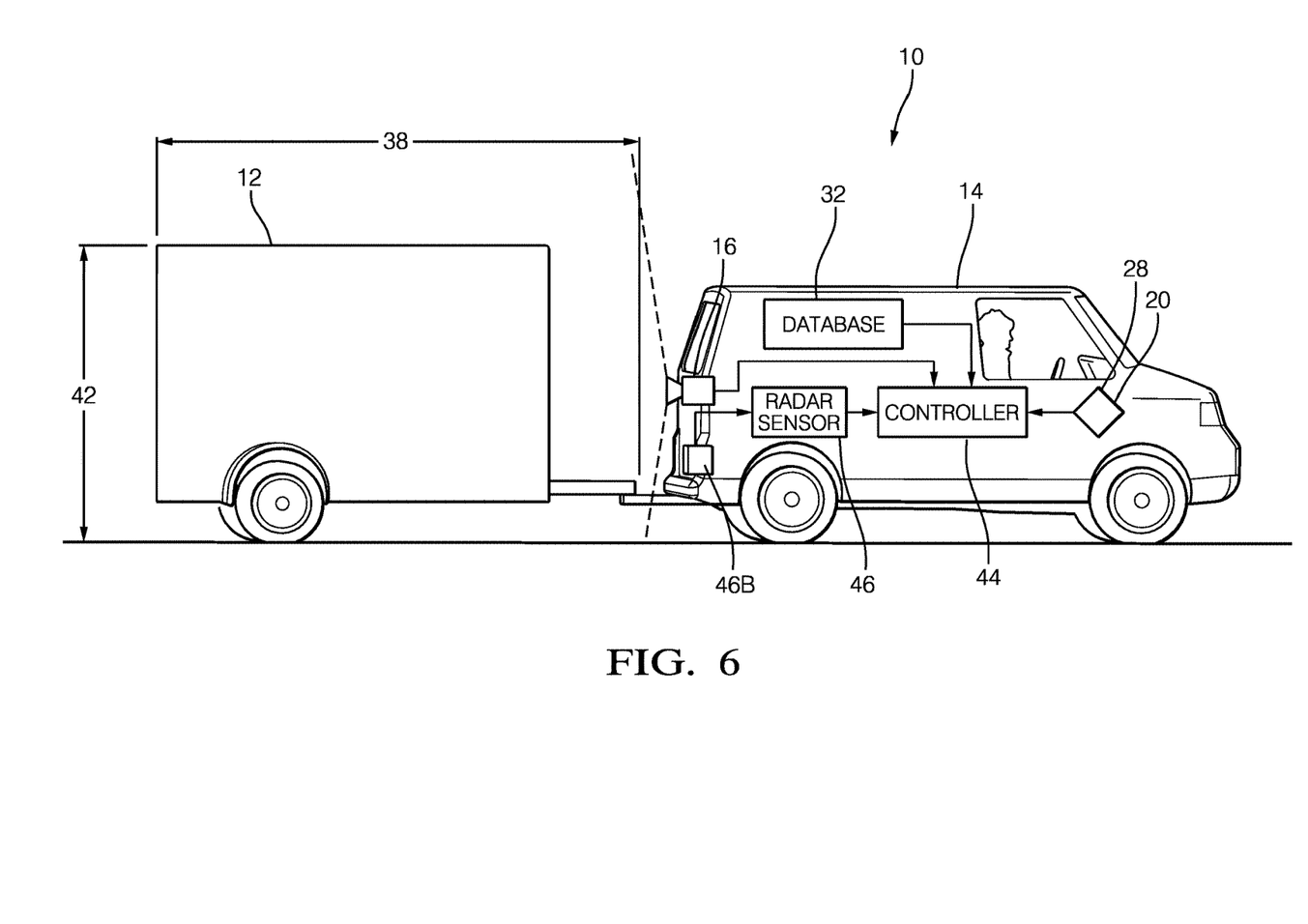
FIG. 6 is a side-view of the host-vehicle of FIG. 1 equipped with a trailer-detection system and towing a trailer in accordance with one embodiment.

The system 10 includes a database 32 (FIG. 3) that associates a character 34 with a trailer-model 36. The character 34 may be an illustration or a lettering or a combination of the illustration and the lettering that is unique to the trailer-model 36 and may be applied to the front of the trailer 12 by the manufacturer of the trailer 12. The information in the database 32 related to the trailer-model 36 may include one of a trailer-width 38 (FIG. 1), a trailer-length 40 (FIG. 1), and a trailer-height 42 (FIG. 6). Other specifications of the trailer 12 may be contained in the database 32 and include, but are not limited to, a trailer-weight, a brake-type, an axle-distance to a hitch-coupler, a tongue-weight, and a trailer-manufacturer, for example. The contents of the database 32 may reside on the host-vehicle 14 in a controller 44 or may reside remotely and may be accessible via wireless communication protocols known in the industry. The database 32 may be periodically updated with information for new models of trailers 12 as they are released into production. Updates to the database 32 may occur locally (i.e. directly downloaded to the host-vehicle 14) or may occur remotely via wireless transmission.

The system 10 includes the controller 44 in electrical communication with the camera 16, the angle-detector 20, and the database 32. The controller 44 may include a processor (not shown) such as a microprocessor or other control circuitry such as analog and/or digital control circuitry including an application specific integrated circuit (ASIC) for processing data as should be evident to those skilled in the art. The controller 44 may include a memory (not shown), including non-volatile memory, such as electrically erasable programmable read-only memory (EEPROM) for storing one or more routines, thresholds and captured data. The one or more routines may be executed by the processor to perform steps for determining if signals received by the controller 44 indicate the presence of objects as described herein.

The controller 44 is configured to receive the image 18 from the camera 16 and detect the character 34 (FIG. 2) on the trailer 12 in order to identify the trailer-model 36. The controller 44 may use known optical-character-recognition (OCR) methods to match the characters 34 in the image 18 captured by the camera 16 with the characters 34 in the database 32. One skilled in the art of OCR will recognize that methods such as optical-word-recognition (OWR), intelligent-character-recognition (ICR), and intelligent-word-recognition (IWR) are all considered OCR methods and may be applied by the controller 44 to identify the trailer-model 36. The OCR methods may include pre-processing of the image 18 to improve the success rate of recognition of the characters 34, matrix-matching, feature extraction, and application-specific optimizations, and will be recognized by those skilled in the art of OCR.

Figure 5A:
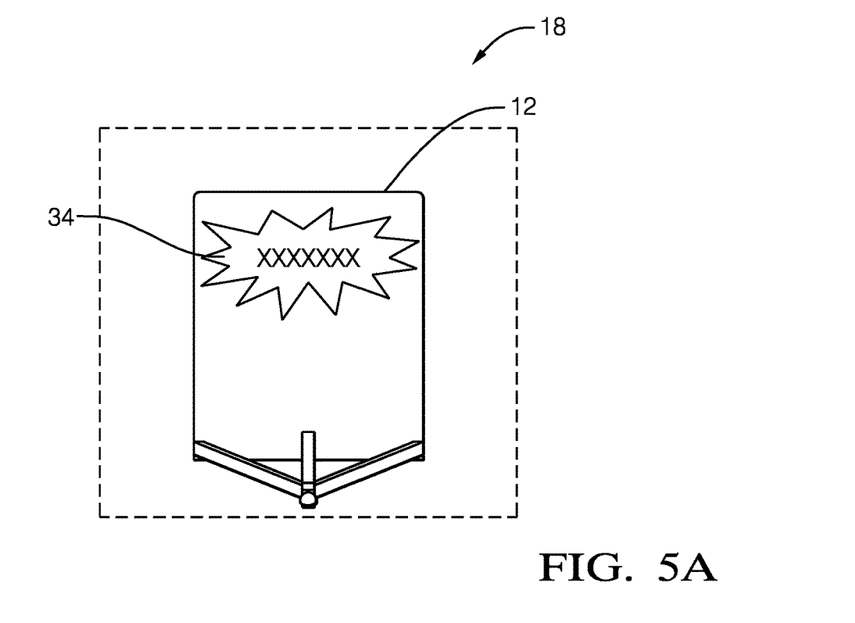
FIG. 5A is an image of a trailer captured by a camera of the trailer-identification system of FIG. 1 in accordance with one embodiment.
Figure 5B:
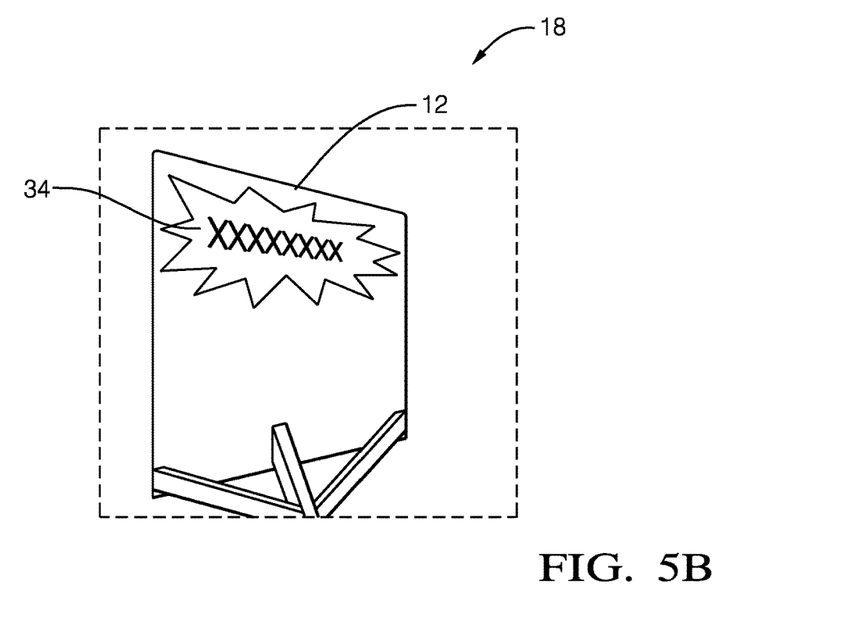
FIG. 5B is an image of a trailer captured by a camera of the trailer-identification system of FIG. 4 in accordance with one embodiment.

The controller 44 is further configured to identify the trailer-model 36 based on the trailer-angle 22. FIG. 5A illustrates the image 18 of the trailer 12 with the trailer-angle 22 equal to zero degrees and FIG. 5B illustrates the image 18 of the trailer 12 where the trailer-angle 22 is greater than zero degrees. The orientation of the trailer 12 relative to the host-vehicle 14 is the same in FIG. 5B and FIG. 4. FIG. 5B also illustrates how the character 34 in the image 18 may be skewed due to the trailer-angle 22. That is, the characters 34 on the right-half of the front of the trailer 12 in FIG. 5B appear larger than the characters 34 on the left-half of the front of the trailer 12. The controller 44 compensates for the skewing of the character 34 in the image 18 of FIG. 5B by using the trailer-angle 22 as input to a rotation-matrix (not shown) to create a compensated-image (not shown). The compensated-image is translated to the expected appearance of the image 18 with the trailer-angle 22 at zero degrees (FIG. 5A). The compensated-image may then be pattern-matched to the database 32 by the known OCR methods.

The system 10 also includes a radar-sensor 46 used to detect an other-vehicle 48 present in a blind-zone 50 proximate to the host-vehicle 14. The radar-sensor 46 is configured to emit a radar-signal (not shown) toward a defined-area 52 proximate to the host-vehicle 14, and detect a reflected-signal (not shown) arising from the radar-signal being reflected by detected-targets. When the trailer 12 is being towed, there will generally be some consistent reflected signals created from strong-targets such as the front of the trailer 12 or other highly reflective objects such as wheel wells or fenders of the trailer 12; and some intermittent reflected signals from weak-targets such as the back bumper of the trailer 12 or smaller examples of the other-vehicle 48 such as a motorcycle for example. Reflected-signals from the weak-targets may be, for example, a multi-path reflection from under the trailer 12 as the signal bounces between the trailer 12 and ground, or by multi-path reflections traveling through a grated open-trailer or cross-frame members of the frame of the trailer 12.

In the non-limiting example illustrated in FIG. 1, the radar-sensor 46 includes a left-sensor 46A and a right-sensor 46B. A radar sensor-system with a similarly configured radar-sensor 46 is available from Delphi Inc. of Troy, Mich., USA and marketed as an Electronically Scanning Radar (ESR) or a Rear-Side-Detection-System (RSDS). It is contemplated that the teachings presented herein are applicable to radar-systems with one or more sensor devices.

The radar-sensor 46 is generally configured to output a reflection-signal that may include data indicative of a detected-target present in the defined-area 52. Data that corresponds to the strong-targets will generally be from consistent, non-intermittent signals. However, data that corresponds to the weak-targets may be intermittent or have some substantial variability due to a low signal-to-noise ratio.

By way of example and not limitation, the radar-sensor 46 may be configured to output a continuous or periodic data stream that includes a variety of signal characteristics associated with each target detected. The signal characteristics may include, but are not limited to a range (not shown) to the detected-target from the host-vehicle 14, a target-angle (not shown) to the detected-target relative to the host-vehicle-longitudinal-axis 24, an amplitude (not shown) of the reflected-signal, and a relative-velocity (not shown) of closure relative to the detected-target. A target is generally detected because the reflected-signal from the detected-target has sufficient signal strength to meet some predetermined threshold. That is, there may be targets that reflect the radar-signal, but the strength of the reflected-signal is insufficient to be characterized as one of the detected-targets.

The controller 44 is generally configured to determine if the reflection-signal arising from the detected-target corresponds to (i.e. is associated with) the trailer 12 being towed by the host-vehicle 14. That is, the controller 44 determines if the trailer 12 is present, so is actually being towed by the host-vehicle 14. The controller 44 is also generally configured to define a trailer-boundary 54 characterized as occupied by the trailer 12 and thereby excluded from the defined-area 52 where objects can be detected in the blind-zone 50. By defining the portion of the defined-area 52 that is the trailer-boundary 54, the controller 44 can more readily determine if what seems to be a new target indicated by the reflected-signal is likely from the trailer 12, or is likely from something other than the trailer 12, such as the other-vehicle 48. The controller 44 may also be configured to activate an alert-device 56 to warn an operator 58 of the host-vehicle 14 if the other-vehicle 48 is detected in the blind-zone 50. The blind-zone 50 preferably extends for a distance of four meters (4-meters) beyond the rear of the trailer 12 and may be calibrated to any distance desired. The blind-zone 50 preferably extends for a distance of 4-meters perpendicular to the left-side and right side of the host-vehicle 14 to sense objects in an adjoining roadway lane and may be calibrated to any distance desired. The boundaries of the defined-area 52 extend to the limits of the radar-signal and are considered to be infinite for the purposes of this example. As used herein, the trailer-boundary 54 and the blind-zone 50 are both subsets of a sensing-boundary 60.

The reflection-signal may be analyzed to categorize the data from each detected-target with respect to a list of previously detected-targets having established tracks. As used herein, a track refers to one or more data sets that have been associated with a particular one of the detected-targets. By way of example and not limitation, if the amplitude of the reflected-signal indicated in the reflection-signal is above a predetermined amplitude threshold, then the controller 44 determines if the data corresponds to a previously detected-target or if a new-target has been detected. If the data corresponds to a previously detected-target, the data is added to or combined with prior data to update the track of the previously detected-target. If the data does not correspond to any previously detected-target because, for example, it is located too far away from any previously detected-target, then it may be characterized as a new-target and assigned a unique track identification number. The identification number may be assigned according to the order that data for a new detected-target is received, or may be assigned an identification number according to a grid location in the defined-area 52.

The expectation is that a detected-target or a track that corresponds to (i.e. is associated with) the trailer 12 would have a relative-velocity near zero, and that this condition would persist for an extended period of time. That is, the detected-target corresponds to the trailer 12 if a range to the detected-target varies less than a variation threshold (e.g. less than 0.25 meters) for greater than a time threshold (e.g. greater than 5 seconds). It is noted that characterizing a target as having a relative-velocity near zero and having a variation in range less than a variation threshold are effectively the same characterization. As such, references to the term 'range-rate' in the discussion that follows are directly comparable to the terms 'relative-velocity', 'relative-rate' and 'variation-in-range'.

Figure 7:
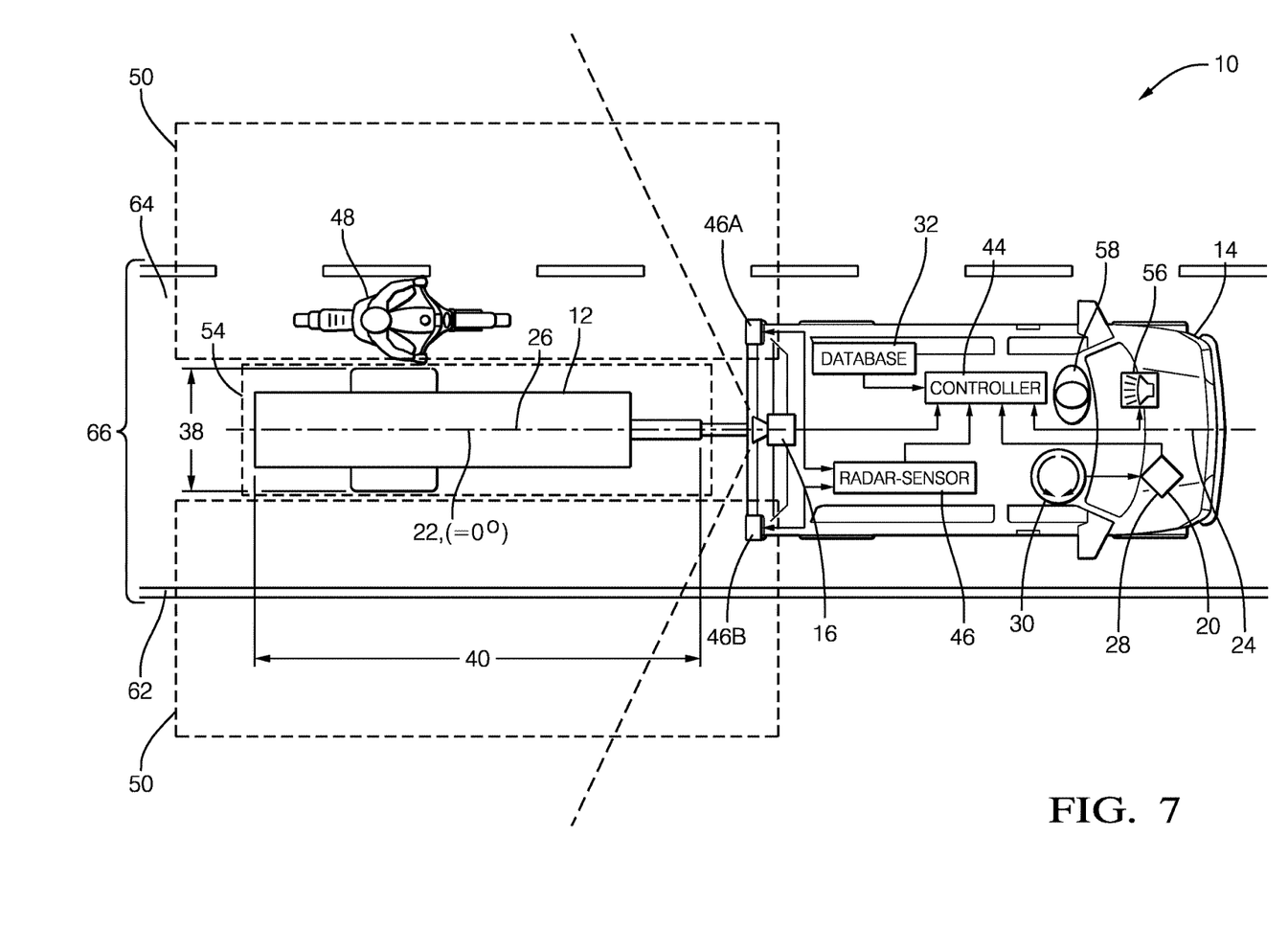
FIG. 7 is a top-view of a host-vehicle equipped with a trailer-identification system and towing a trailer that is not as wide as the host-vehicle in accordance with one embodiment.

The controller 44 is further configured to adjust the blind-zone 50 proximate to the host-vehicle 14 based on the trailer-model 36. Once the trailer-model 36 is identified by the controller 44, the controller 44 may use the trailer-width 38 from the database 32 to adjust the inboard-boundaries of the blind-zone 50 to be collinear with the sides of the trailer 12. FIG. 7 illustrates the adjustment of the inboard-boundaries of the blind-zone 50 to be collinear with the sides of the trailer 12 where the trailer 12 is not as wide as the host-vehicle 14. Note that, in contrast to FIG. 1, the inboard-boundaries of the blind-zone 50 encroach on a lane-marking 62 of a roadway that may be detected by the camera 16. This adjusted blind-zone 50 is useful to detect a smaller other-vehicle 48 that may be traveling in a same travel-lane 64 (e.g. lane-splitting) as the host-vehicle 14 and trailer 12, such as a motorcycle for example.

The controller 44 is further configured to modify the blind-zone 50 based on the trailer-angle 22. FIG. 4 illustrates the same system 10 from FIG. 1 when the host-vehicle 14 is turning while towing the trailer 12. In this non-limiting example the controller 44 is further configured to adjust the sensing-boundary 60 based on the trailer-angle 22. The controller 44 is further configured to adjust the trailer-boundary 54 based on the adjusted sensing-boundary 60 such that the detected-target, or a track that corresponds to the trailer 12, may continue to be tracked by the system 10 as described previously. The controller 44 is further configured to adjust the blind-zone 50 based on the adjusted trailer-boundary 54 to maintain the blind-zone 50 proximate to the trailer-boundary 54. If these adjustments are not made, the previously detected-targets in the trailer-boundary 54 would be considered by the system 10 as being in the blind-zone 50 (due to the yaw of the host-vehicle 14), likely resulting in a false detection of new-targets and cause the alert-device 56 to be activated. Optionally, the controller 44 may be further configured to use the radar-sensor 46 to determine the relative-velocity of the tracked-target associated with the trailer 12, and determine the trailer-angle 22 based on a longitudinal-velocity and a lateral-velocity of the detected-target.

An additional benefit to adjusting the trailer-boundary 54 based on the trailer-angle 22 may be realized in other autonomous-vehicle or semi-autonomous-vehicle applications where the controller 44 may be configured to determine whether a current path of the host-vehicle 14 and trailer 12 may collide with an object or other-vehicle 48, based on the turning path of the combination of the host-vehicle 14 and the trailer 12. In such a situation, the controller 44 may also be configured to activate the alert-device 56 to warn the operator 58 of the impending collision.

The image 18 may also include, but is not limited to, the lane-marking 62 on the left side and on the right side of the travel-lane 64 of the roadway. The lane-marking 62 may include a solid-line, as is typically used to indicate the boundary of the travel-lane 64 of the roadway. The lane-marking 62 may also include a dashed-line, as is also typically used to indicate the boundary of the travel-lane 64 of the roadway. The controller 44 is further configured to determine a centerline (not shown) on the roadway for the trailer 12 based on the lane-marking 62 of the roadway detected by the camera 16. That is, the image 18 detected or captured by the camera 16 is processed by the controller 44 using known techniques for image-analysis to determine where along the roadway the trailer 12 should be centered. Vision processing technologies, such as the EYE Q® platform from Mobileye Vision Technologies, Ltd. of Jerusalem, Israel, or other suitable devices may be used. By way of example and not limitation, the centerline is preferably in the middle of the travel-lane 64 defined by the lane-marking 62 of the roadway. The controller 44 is also configured to determine a lane-width 66 of the travel-lane 64 using the known vision processing technologies described above.

Figure 8:
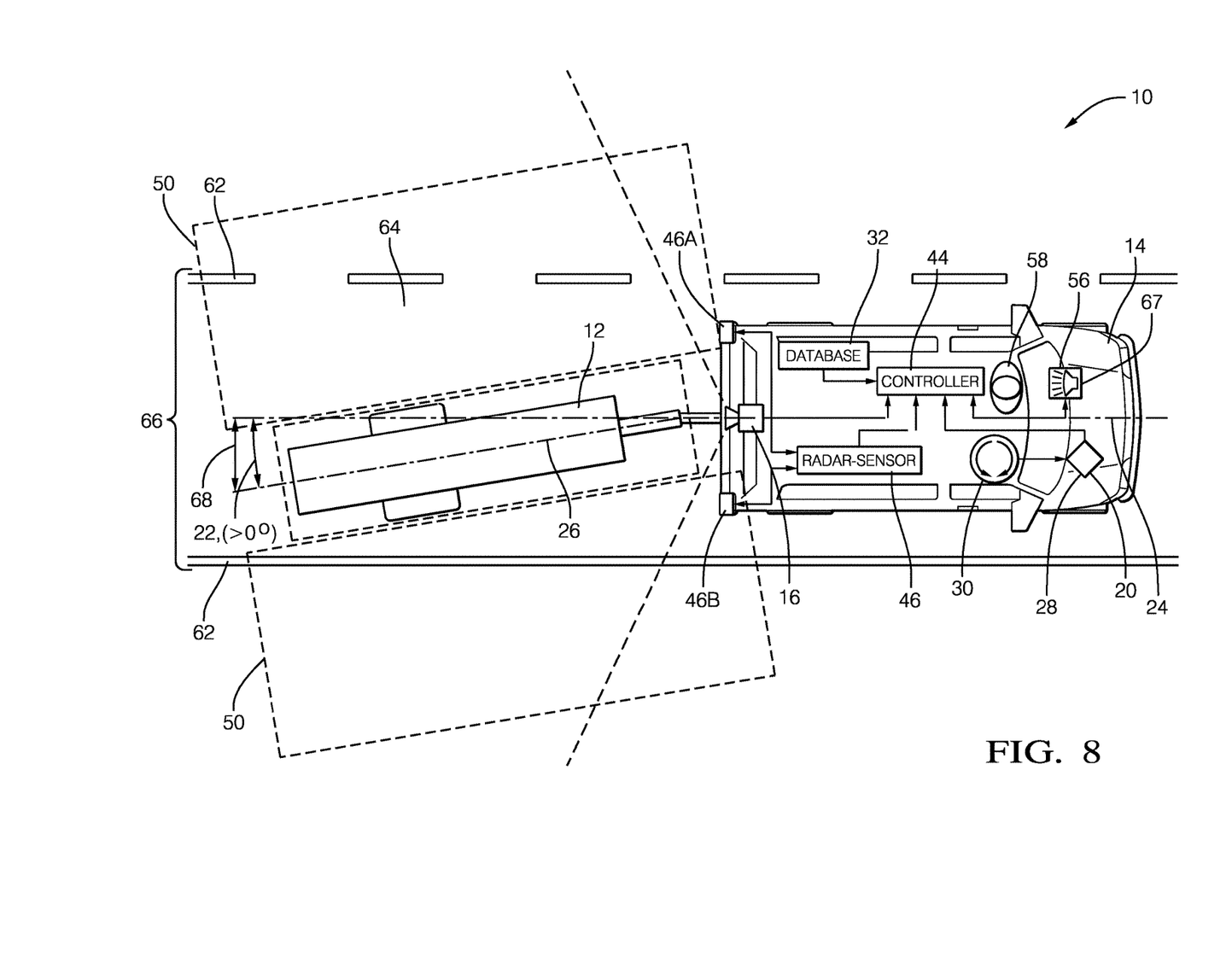
FIG. 8 is a top-view of the same host-vehicle in FIG. 7 equipped with a trailer-identification system and towing a trailer that is not as wide as the host-vehicle and in accordance with one embodiment.

The controller 44 is further configured to determine when the trailer 12 is departing from the travel-lane 64 based on the trailer-angle 22 and the trailer-model 36, and may activate the alert-device 56 to warn the operator 58 of the host-vehicle 14 that the trailer 12 is making an unintentional departure from the travel-lane 64, i.e. issue a lane-departure-warning 67 (FIG. 8). The controller 44 may consider the departure of the trailer 12 from the travel-lane 64 unintentional when a turn-signal of the host-vehicle 14 is not activated prior to the departure of the trailer 12 from the travel-lane 64, for example. The controller 44 is configured to determine the position of the rear corners of the trailer 12 relative to the lane-markings 62, based on the trailer-width 38, the trailer-length 40, and the trailer-angle 22, as will be understood by one skilled in the art of geometry. The controller 44 may then activate the alert-device 56 to warn the operator 58 of the host-vehicle 14 that the trailer-angle 22 exceeds an angle-threshold 68 indicative of the trailer 12 making an unintentional departure from the travel-lane 64. The angle-threshold 68 is determined by the controller 44 and is dependent on the trailer-width 38 and the trailer-length 40 of the trailer-model 36, as will be recognized by one skilled in the art of geometry. FIG. 8 illustrates the angle-threshold 68 being exceeded for the trailer 12 shown in FIG. 7. Note that the trailer 12 is departing the travel-lane 64 as illustrated by the right-rear corner of the trailer 12 crossing the solid lane-marking 62 on the right-side of the travel-lane 64.

Accordingly, a trailer-identification system 10, and a controller 44 for the trailer-identification system 10 is provided. The trailer-identification system 10 is an improvement over previous systems because it uses the database 32 of trailer-models 36 that includes specifications of the trailer 12 that may be used to determine and adjust the blind-zone 50 proximate to the host-vehicle 14 and the trailer 12.

While this invention has been described in terms of the preferred embodiments thereof, it is not intended to be so limited, but rather only to the extent set forth in the claims that follow.

We claim:

1. A trailer-identification system configured to identify a trailer towed by a host-vehicle, said system comprising:
    a camera used to capture an image of a trailer towed by a host-vehicle;
    a radar-sensor configured to detect an other-vehicle present in a blind-zone proximate to the host-vehicle, said blind-zone extending a distance perpendicular to a left-side and a right-side of the host-vehicle and extending a distance beyond a rear of the trailer;
    a database that associates the character in the image with the trailer-model, the database including dimensions of the trailer related to the trailer-model; and
    a controller in communication with the camera, the radar-sensor, and the database, said controller configured to detect a character on the trailer, identify a trailer-model of the trailer based on the character, and adjust the blind-zone proximate to the host-vehicle based on the trailer-model, wherein inboard-boundaries of the adjusted blind-zone are collinear with sides of the trailer, and wherein a trailer-boundary is excluded from the blind-zone.

2. The system in accordance with claim 1, wherein the database includes one of a trailer-width, a trailer-length, and a trailer-height of the trailer-model.

3. The system in accordance with claim 1, wherein the system includes an angle-detector used to determine a trailer-angle of the trailer, and the controller is further configured to identify the trailer-model based on the trailer-angle.

4. The system in accordance with claim 3, wherein the blind-zone is further modified based on the trailer-angle.

5. The system in accordance with claim 3, wherein a lane-departure-warning is activated when the trailer-angle exceeds an angle-threshold.

6. The system in accordance with claim 5, wherein the angle-threshold is based on the trailer-model.

* * * * *